United States Patent
Takahashi et al.

(10) Patent No.: US 9,292,202 B2
(45) Date of Patent: Mar. 22, 2016

(54) CLIENT DEVICE, OPERATING METHOD, AND RECORDING MEDIUM

(71) Applicant: SONY MOBILE COMMUNICATIONS AB, Lund (SE)

(72) Inventors: Norihiro Takahashi, Tokyo (JP); Naoki Yoshioka, Kanagawa (JP)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 10 days.

(21) Appl. No.: 14/192,434

(22) Filed: Feb. 27, 2014

(65) Prior Publication Data
US 2014/0240239 A1    Aug. 28, 2014

Related U.S. Application Data

(60) Provisional application No. 61/770,759, filed on Feb. 28, 2013.

(51) Int. Cl.
*G06F 3/0489* (2013.01)
*G06F 3/0488* (2013.01)

(52) U.S. Cl.
CPC .......... *G06F 3/0489* (2013.01); *G06F 3/04886* (2013.01)

(58) Field of Classification Search
CPC ............................ G06F 3/041; G06F 3/0489
USPC ......................................................... 345/173
See application file for complete search history.

(56) References Cited

U.S. PATENT DOCUMENTS

2013/0239063 A1*  9/2013  Ubillos et al. ................ 715/838

* cited by examiner

*Primary Examiner* — Sahlu Okebato
(74) *Attorney, Agent, or Firm* — Oblon, McClelland, Maier & Neustadt, L.L.P.

(57) ABSTRACT

A touch input device that includes a touch panel stacked with a display or integrally disposed with a display, and a controller. During a state of the display displaying a designated image, upon detecting that a specific location in the image has been touched with the touch panel, the controller detects a velocity by which a touch position changes and a direction in which the touch position changes while the touch continues, and determines an input instruction.

6 Claims, 12 Drawing Sheets

CLIENT DEVICE, OPERATING METHOD, AND RECORDING MEDIUM

CROSS REFERENCE TO RELATED APPLICATIONS

This application is related to and claims priority under 35 U.S.C. §119(e) to Provisional Application Ser. No. 61/770,759, filed Mar. 1, 2013, the contents of which are hereby incorporated herein by reference.

BACKGROUND

1. Field

The present disclosure relates to a client device, an operating method, and a recording medium, and more particularly, to technology applied to a client device equipped with a touch panel.

2. Description of the Related Art

On mobile client devices with advanced functionality such as smartphones, various operations are possible via touch operations on a display screen. In other words, a smartphone is equipped with a touch panel, and touch operations are possible by having a user touch a display screen with a finger or pen.

One operation using a touch panel is a software keyboard. With a software keyboard, a keyboard is displayed on a display. Then, by having the user touch a key on the displayed keyboard with a finger or pen, a letter or number assigned to the touched key is input.

When a display panel displays such a software keyboard, in one case a large number of keys, such as the 26 letters of the alphabet and symbols, for example, may be displayed as a keyboard with a QWERTY layout, whereas in another case the keys may be displayed as a keyboard with a layout based on the number keys of a telephone.

In the case of displaying keys as a keyboard with a QWERTY layout, since it is necessary to arrange a large number of keys for display, there is a problem in that the pitch narrows for each individual key.

In the case of displaying keys as a keyboard with a layout based on the number keys of a telephone, it is sufficient to place approximately a dozen keys for the numbers 0, 1, 2, . . . , 9, and some symbols. For this reason, individual keys that are comparatively large may be placed, and the pitch may be widened for each individual key.

Meanwhile, in the case of a keyboard based on number keys, since there is a small number of keys, it is necessary to assign many letters to a single key. For example, the three letters "A", "B", and "C" are assigned to the "2" key. Then, when inputting the letter "A", the user performs an operation of pressing the "2" key once. When inputting the letter "B", the user performs an operation of pressing the "2" key twice. In this way, the input of multiple letters is distinguished by the number of times the same key is pressed.

With such an operation of pressing a key multiple times, there is a problem in that the number of key presses becomes large depending on the type of input letter, and the input operation becomes complicated.

For this reason, when displaying a software keyboard based on number keys, technology is implemented that enables multiple letter inputs to be distinguished with a single touch, according to the motion of the touching finger. In other words, the user inputs the letter "B" by touching the key labeled "2", sliding the finger to the left while in that state, and then releasing, for example. Also, the user inputs the letter "C" by touching the key labeled "2", sliding the finger up while in that state, and then releasing. Also, the user inputs the letter "A" by touching the key labeled "2" and then releasing the finger without sliding.

Since letters may be specified by the up, down, left, and right slide directions in this way, the input of a maximum of five letters may be specified for every single key.

Such an input operation is executed by having a controller that control input operations determine the direction in which a finger slides from a touch position, and the slide distance. In other words, the controller determines the coordinate data of a touch position supplied from the touch panel, and determines the slide direction and slide distance from the touch position. On the basis of this determination, the controller conducts an input process for the corresponding letter.

However, with a technique of the related art configured to make a determination using the slide distance from a touch position, in many cases input that reflects the user's intentions is not possible due to the user's operating conditions. In other words, with the letter input operation discussed above, when the controller determines that sliding over a distance that is equal to or greater than a predetermined threshold has been performed, the controller decides on the input of the letter in that sliding direction. For this reason, if the user releases his or her finger while the sliding distance is in a short state less than or equal to the threshold, a letter that is different from the user's intended letter will be input.

Note that although the examples up to this point describe problems when displaying a software keyboard, similar problems exist when performing similar touch operations on the basis of another display.

The inventor has recognized the need to improve operability in the case of inputting letters or the like with a combination of touch operations and slide operations.

BRIEF SUMMARY

A client device according to the present disclosure is equipped with a touch panel stacked or integrally disposed with a display, and a controller that applies control on the basis of a detection by the touch panel.

The controller, during a state of the display displaying a designated image, upon detecting that a specific location in the image has been touched with the touch panel, detects a velocity by which a touch position changes and a direction in which the touch position changes while the touch continues, and determines an input instruction.

Also, an operating method according to the present disclosure is an operating method applied to a client device including a touch panel stacked or integrally disposed with a display, and includes a detecting step and a determining step.

The detecting step, during a state of the display displaying a designated image, upon detecting that a specific location in the image has been touched with the touch panel, detects a velocity by which a touch position changes and a direction in which the touch position changes while the touch continues.

The determining step determines an input instruction on the basis of the velocity and direction detected in the detecting step.

Also, a storage or recording medium according to the present disclosure is a storage medium storing a program to be installed on a client device equipped with a touch panel stacked or integrally configured with a display.

The program stored by the storage medium includes a detecting step and a determining step.

The detecting step, during a state of the display displaying a designated image, upon detecting that a specific location in the image has been touched with the touch panel, detects a velocity by which a touch position changes and a direction in which the touch position changes while the touch continues.

The determining step determines an input instruction on the basis of the velocity and direction detected in the detecting step.

According to the present disclosure, a controller detects motion from a position initially touched by a user's finger or the like, on the basis of the velocity by which the touch position changes, and the direction in which the touch position changes. For this reason, by appropriately setting a velocity threshold that determines whether or not motion exists, the controller becomes capable of detecting a touch operation state with few errors.

DETAILED DESCRIPTION

Figure 1:
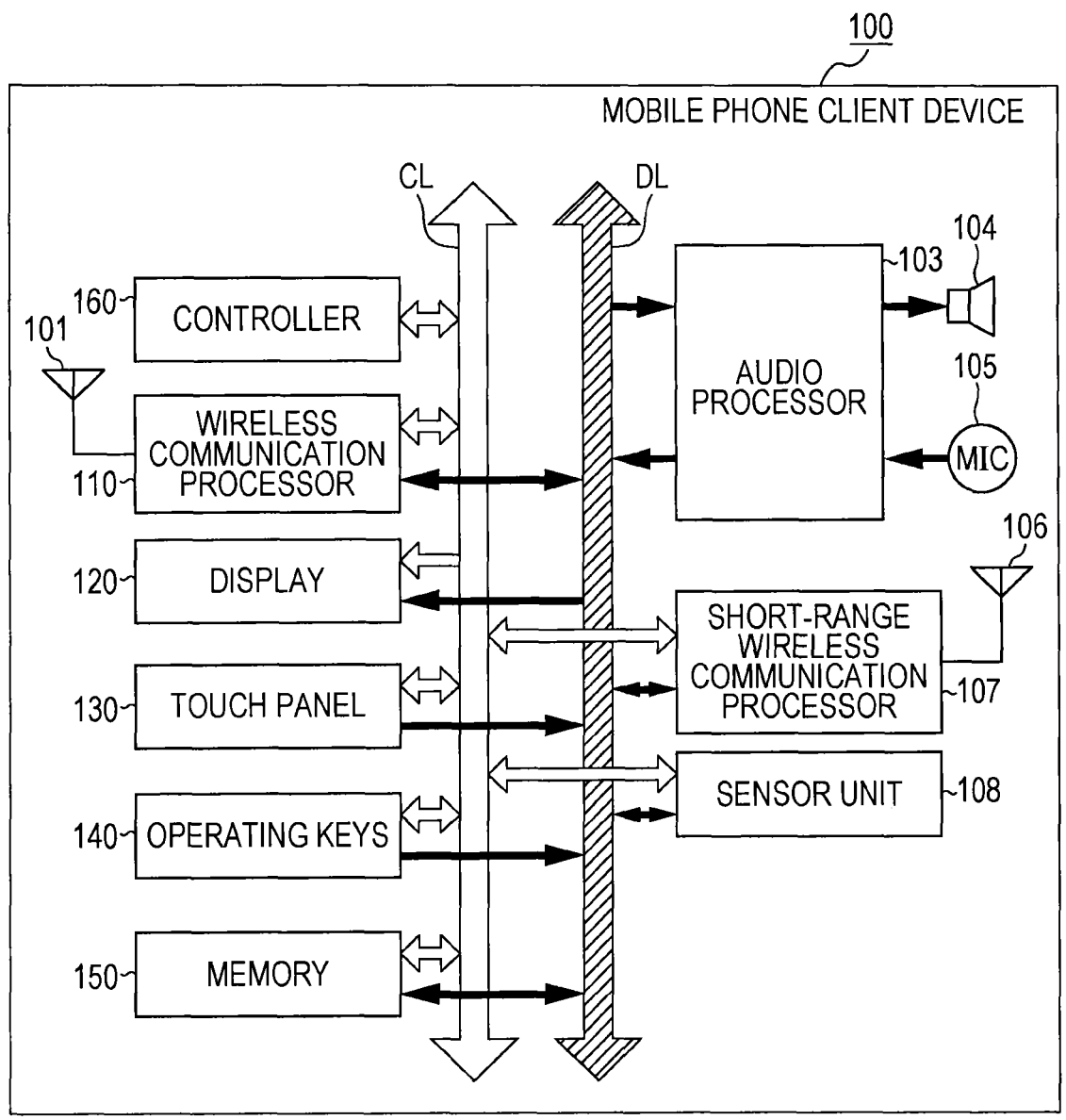
FIG. 1 is a block diagram illustrating an exemplary configuration of a client device according to an embodiment of the present disclosure.

Hereinafter, examples of a client device, an operating method, and a recording medium according to an embodiment of the present disclosure will be described in the following order and with reference to the drawings.
1. Configuration of client device (FIGS. 1, 2)
2. Example of touch detection operation (FIGS. 2, 3)
3. Example of control process based on touch detection (FIGS. 4, 5)
4. Exemplary display of number keys (FIGS. 6, 7)
5. Exemplary display of alphabet keys (FIGS. 8 to 11)
6. Example of other display state (FIG. 12)
7. Modifications
[1. Configuration of Client Device]
FIG. 1 is a diagram illustrating a configuration of a mobile phone client device 100 according to the present disclosure.

The mobile phone client device 100 is equipped with an antenna 101 for wirelessly communicating with a base station for wireless telephony. The antenna 101 is connected to a wireless communication processor 110. The wireless communication processor 110, under control by a controller 160, conducts processing for transmitting and receiving wireless signals. The controller 160 transmits control commands to the wireless communication processor 110 via a control line CL. The controller 160 controls the respective components of the mobile phone client device 100 by reading out a program (software) stored in memory 150 via the control line CL, and executing the program. In the memory 150 provided in the mobile phone client device 100, there is stored data prepared in advance, such as a program, as well as data generated by user operations. The storing of data in the memory 150 and the reading out of data from the memory 150 are conducted under control by the controller 160.

During audio telephony, call-related audio data received by the wireless communication processor 110 is supplied to an audio processor 103 via a data line DL. The audio processor 103 conducts a demodulation process on the supplied audio data, and obtains an analog audio signal. The analog audio signal obtained by the audio processor 103 is supplied to a speaker 104, and audio is output from the speaker 104.

Also, during an audio call, the audio processor 103 converts an audio signal output by a microphone 105 into audio data in a transmission format. Subsequently, the audio data converted by the audio processor 103 is supplied to the wireless communication processor 110 via the data line DL. Audio data supplied to the wireless communication processor 110 is then packetized and wirelessly transmitted.

In the case of data communication or mail sending and receiving via a network such as the Internet, the wireless communication processor 110 conducts a process of transmitting and receiving under control by the controller 160. For example, data received by the wireless communication processor 110 is stored in the memory 150, and a process such as a display based on stored data is conducted under control by the controller 160. Also, data stored in the memory 150 is supplied to the wireless communication processor 110 and wirelessly transmitted. When it is necessary to discard received mail data, the controller 160 deletes data stored in the memory 150.

The mobile phone client device 100 is equipped with a display 120. The display 120, under control by the controller 160, displays images and various information on a display panel. A liquid crystal display panel or an organic electroluminescence (EL) display panel is used as the display panel, for example. The controller 160 also controls the display when the display 120 displays a keyboard discussed later.

Additionally, the mobile phone client device 100 is equipped with a touch panel 130. When an object such as a finger or pen touches the screen of the display panel, the touch panel 130 detects the touch position. The touch panel 130 is stacked with or integrally disposed with the display panel, and detects a touch by a finger, pen, or the like in an area in which the display panel displays an image or the like.

For the touch panel 130, one of the capacitive type may be used, for example, in which a touch on the surface of the display panel by a finger or the like is detected from changes in electrostatic capacitance. For the touch panel 130, one of a method other than the capacitive type may also be used.

Data of a touch position detected by the touch panel 130 is transmitted to the controller 160. The controller 160 executes an activated application on the basis of the supplied touch position. For example, when the display 120 displays a keyboard, the controller 160 determines which key has been touched on the basis of a touch position detected by the touch panel 130. A touch position is expressed as a coordinate position of two orthogonal axes, namely an X axis (horizontal axis) and a Y axis (vertical axis), for example.

The mobile phone client device 100 is also equipped with operating keys 140. Operation information from the operating keys 140 is transmitted to the controller 160. Note that most operations on the mobile phone client device 100 are performed by touch panel operations using the touch panel 130, while the operating keys 140 perform only some operations.

In addition, the mobile phone client device 100 is equipped with a short-range wireless communication processor 107 connected to an antenna 106. The short-range wireless communication processor 107 conducts short-range wireless communication with a neighboring client device or access point. The short-range wireless communication processor 107 communicates with another device within a range of approximately several tens of meters, for example, by applying the wireless LAN scheme defined as the IEEE 802.11 standard, the scheme named Bluetooth (registered trademark), or the like.

Furthermore, the mobile phone client device 100 is equipped with a sensor unit 108. The sensor unit 108 may include a sensor that detects device motion or orientation, such as an acceleration sensor or a geomagnetic sensor, or a sensor that detects conditions around the mobile phone client device 100, such as a proximity sensor, for example.

Figure 2:
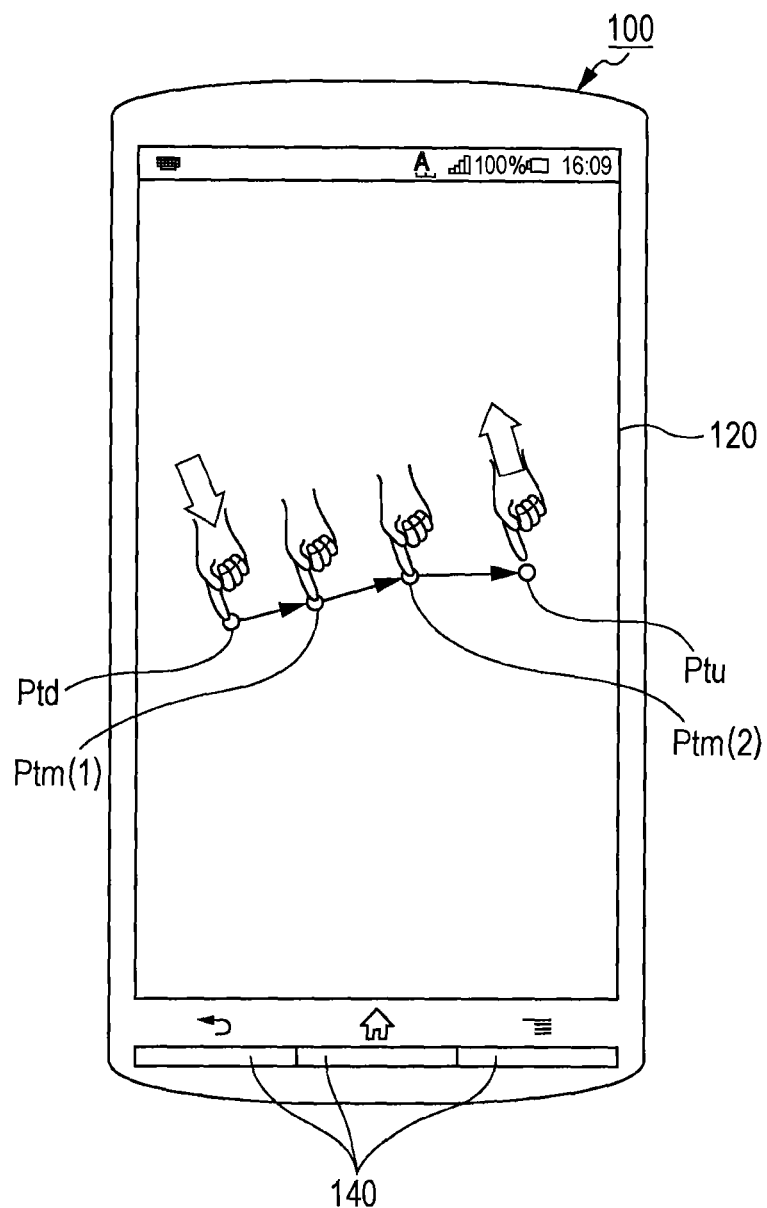
FIG. 2 is a diagram illustrating an example of the shape and exemplary operation of a client device according to an embodiment of the present disclosure.

FIG. 2 is a diagram illustrating an example of the shape of the mobile phone client device 100. As illustrated in FIG. 2, a display 120 made up of a comparatively large display panel is disposed on the front face of the mobile phone client device 100. Also, multiple operating keys 140 are disposed along the bottom edge of the front face of the mobile phone client device 100. The arranged positions of the operating keys 140 illustrated in FIG. 2 are an example, and the mobile phone client device 100 may also be equipped with operating keys 140 in other positions.

[2. Example of Touch Detection Operation]

FIG. 2 illustrates an example of a track made when the user's finger touches the display 120. Assume that the finger's touch on the display panel surface starts at a touch down point Ptd. In addition, assume that while in a state of the finger continuing to touch the display panel surface, the touch position changes, and the finger's touch ends at a touch up point Ptu.

Herein, points between the touch down point Ptd and the touch up point Ptu are designated touch move points. The example in FIG. 2 illustrates two touch move points Ptm(1) and Ptm(2) detected at a fixed time interval. The track joining the touch down point Ptd and the touch up point Ptu is a line for the purpose of explaining changes in touch position, and the display 120 does not display such a track. Also, each touch point is computed from information such as the centroid or center of an area in which the tip of the finger contacted the panel, for example.

Figure 3:
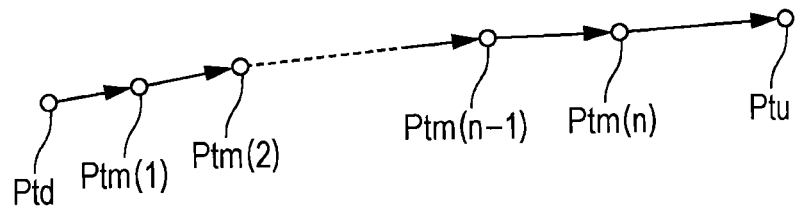
FIG. 3 is a diagram illustrating a detailed example of an operating state according to an embodiment of the present disclosure.

FIG. 3 is an example of a track in the case of finely setting touch move points.

The example in FIG. 3 is an example in which the touch panel 130 has detected n touch points (where n is an integer equal to or greater than 1) at a fixed time interval between the touch down point Ptd and the touch up point Ptu. Namely, after a fixed time interval since the touch down point Ptd, the touch panel 130 detects a touch move point Ptm(1). The touch panel 130 subsequently detects touch move points Ptm(2), Ptm(3), and so on at each fixed time interval, and after detecting a touch move point Ptm(n), detects the touch up point Ptu.

A user operation of sliding the touch position over the display panel as illustrated in FIG. 3 is designated a flick operation or the like. In the example of the present disclosure, the controller 160 determines a flick operation when the moving velocity of the touch position when detecting a touch move point exceeds a preset threshold. However, the threshold used in this case is set to a characteristic that varies according to the elapsed time since detecting the touch down point. This variation characteristic of the threshold will be discussed in detail later.

[3. Example of Control Process Based on Touch Detection]

Figure 4:
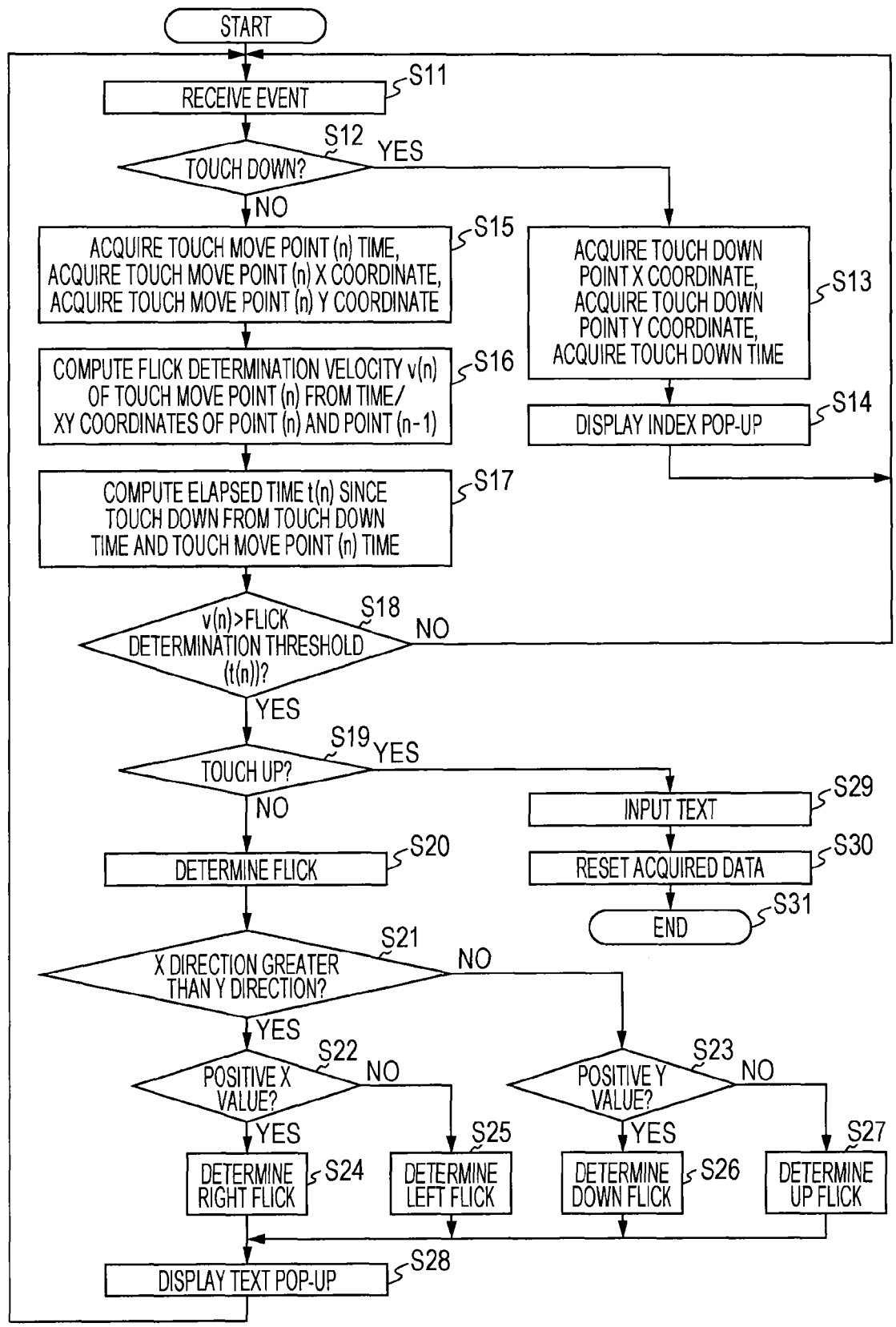
FIG. 4 is a flowchart illustrating an exemplary control process according to an embodiment of the present disclosure.

FIG. 4 is a flowchart illustrating an example of a control process conducted by the controller 160 on the basis of changes in touch position detected by the touch panel 130.

Figure 6:
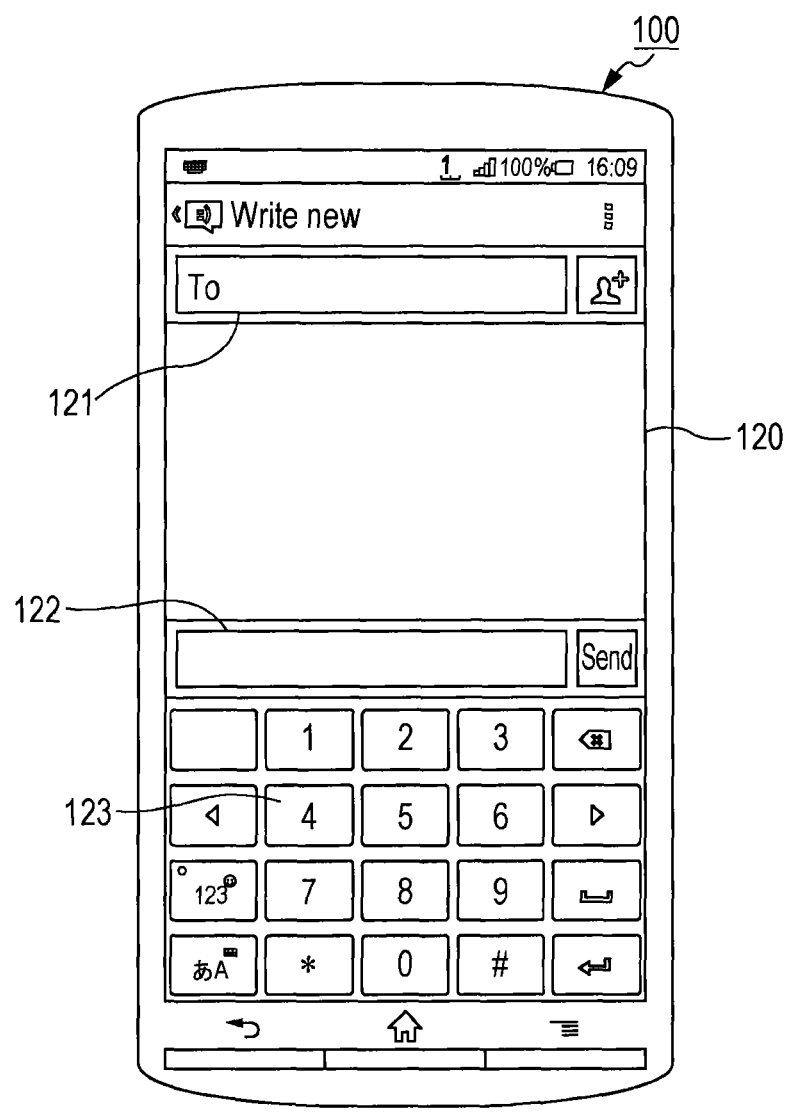
FIG. 6 is a diagram illustrating an exemplary display (example 1) according to an embodiment of the present disclosure.
Figure 8:
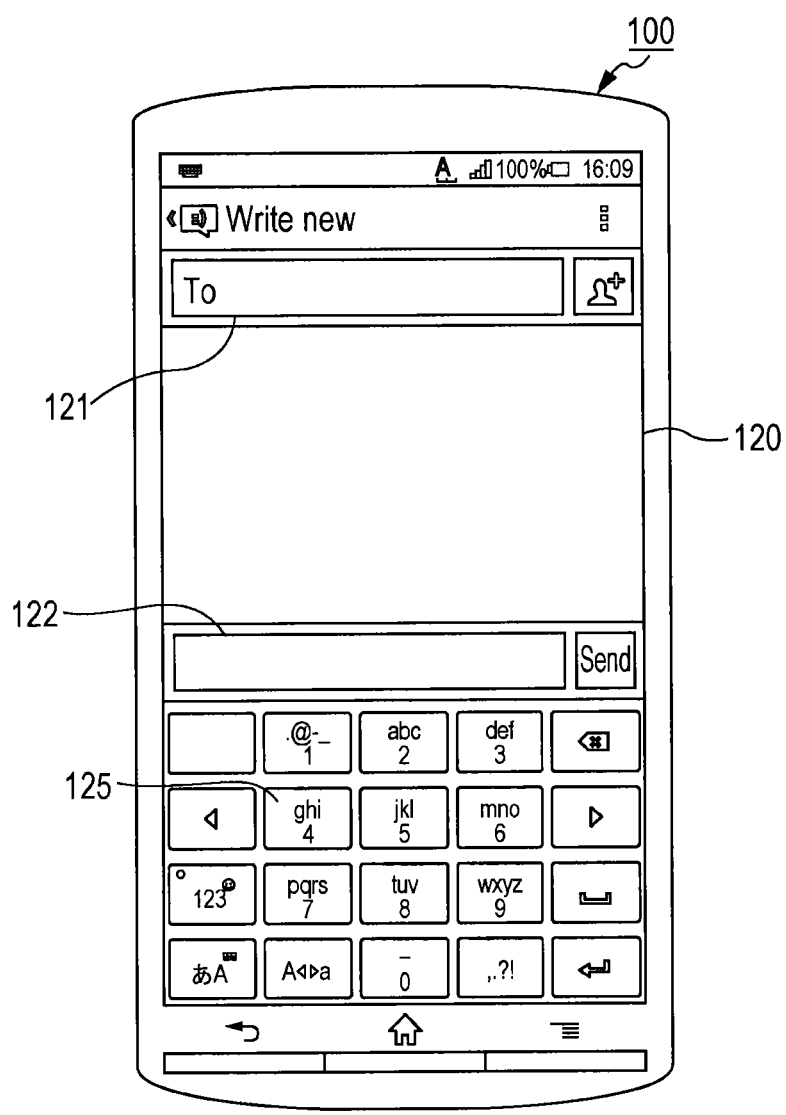
FIG. 8 is a diagram illustrating an exemplary display (example 2) according to an embodiment of the present disclosure.

The flowchart in FIG. 4 is a control process conducted while in a state of the display 120 displaying a keyboard. In other words, a character input keyboard as illustrated in FIG. 6 and FIG. 8 discussed later is displayed.

First, the controller 160, upon receiving an event from the touch panel 130 (step S11), determines whether or not the content of the event is the detection of a touch down point (step S12).

At this point, upon determining that the event is the detection of a touch down point, the controller 160 acquires the coordinates of the touch down point in the X direction and the Y direction, and the time when that touch down point was detected (step S13). From the coordinates of the touch down point, the controller 160 determines the key displayed at that touch down point (the touched key). Subsequently, the controller 160 causes an index pop-up corresponding to the determined key to be displayed within the display screen displayed by the display 120 (step S14). The index pop-up is displayed on top of the touched key, for example. The index pop-up is an image that shows the number, letter, and symbol characters assigned to the touched key. Examples of specific index pop-ups will be described using the exemplary displays.

After displaying the index pop-up, the process returns to the event receiving process of step S11.

When determining in step S12 that the event is not the detection of a touch down point, the controller 160 acquires the coordinates of a touch move point in the X direction and the Y direction, and the time when that touch move point was detected (step S15).

Additionally, the moving velocity v(n) is computed from the difference in the X and Y coordinates, and the difference in the two times, between the touch move point Ptm(n) detected in step S15 and the previous touch move point Ptm (n−1) (step S16).

In other words, the velocity of the touch move point Ptm(n) is computed from the following formula.

$$\{[\text{coordinates of point Ptm}(n)]-[\text{coordinates of point Ptm}(n-1)]/[\text{time of point Ptm}(n)]-[\text{time of point Ptm}(n-1)]\}$$

Note that when the touch move point Ptm(n) is the first touch move point Ptm(1), the velocity v(n) is computed by comparison with the touch down point Ptd. In addition, the velocity may also be computed separately in the X direction and the Y direction, and the larger velocity may be adopted for making a determination. Also, in the case in which the sampling interval is fixed for the touch position, the process of computing the time difference may be omitted from calculation.

After computing the velocity in step S16, the controller 160 computes the elapsed time t(n) from the touch down point Ptd up to the current touch move point Ptm(n) (step S17). After that, the controller 160 determines whether or not the velocity v(n) computed in step S16 exceeds a flick determination threshold (t(n)) determined by the elapsed time t(n) (step S18). In the case in which the velocity v(n) does not exceed the flick determination threshold in the determination of step S18, it is determined that the event is not a flick, and the process returns to the event receiving process of step S11.

Upon determining that the velocity v(n) does exceed the flick determination threshold in the determination of step S18, the controller 160 determines whether or not the content of the received event is a touch up point (step S19). Upon determining that the content of the received event is not a touch up point in the determination of step S19, it is determined that a flick operation is being performed by the user's touch operation (step S20). Subsequently, the process proceeds to a process of determining the direction in which the flick operation is performed.

In other words, the controller 160 compares the coordinate change in the X direction to the coordinate change in the Y direction, and determines whether or not the coordinate change in the X direction is larger (step S21). At this point, in the case in which the coordinate change in the X direction is larger, the controller 160 determines whether the coordinate change in the X direction is in the positive direction or the negative direction (step S22). When the coordinate change in the X direction is in the positive direction in this determination, the controller 160 determines that the event is a flick operation from the touch down point to the right (step S24). Meanwhile, when the coordinate change in the X direction is in the negative direction, the controller 160 determines that the event is a flick operation from the touch down point to the left (step S25).

Meanwhile, in the case in which the coordinate change in the Y direction is larger in step S21, the controller 160 determines whether the coordinate change in the Y direction is in the positive direction or the negative direction (step S23). When the coordinate change in the Y direction is in the positive direction in this determination, the controller 160 determines that the event is a flick operation from the touch down point downwards (step S26). Meanwhile, when the coordinate change in the Y direction is in the negative direction, the controller 160 determines that the event is a flick operation from the touch down point upwards (step S27).

The process of determining the up, down, left, or right direction in steps S21 to S27 may be summarized in a formula as follows.
Provided that $$X = X \text{ coordinate}(n) - X \text{ coordinate}(n-1)$$

$$Y = Y \text{ coordinate}(n) - Y \text{ coordinate}(n-1),$$

When $|X|>|Y|$ and $X>0$, to the right
When $|X|>|Y|$ and $X<0$, to the left
When $|X|<|Y|$ and $Y>0$, upward
When $|X|<|Y|$ and $Y<0$, downward Note that the up, down, left, or right direction determined in steps S21 to S27 is one example.

Upon determining the flick direction in steps S24 to S27, the controller 160 determines the character specified by the flick operation from among the characters assigned to the touched key. Subsequently, the controller 160 causes the characters displayed inside the index pop-up to change to just the determined character (step S28). After that, the process returns to the event receiving process of step S11.

Also, upon determining that the event is not a touch move point in step S19, the controller 160 proceeds to the process treating the event as a touch up point. In other words, upon determining that the event is not a touch move point in step S19, the controller 160 confirms the character last determined in step S28 as the input letter (character) (step S29). At this point, the confirmed character (a letter, number, or symbol) is displayed at the end of the letter input area displayed by the display 120, for example. Subsequently, the controller 160 conducts an acquired data reset process (step S30), and ends the process for one flick operation.

Figure 5:
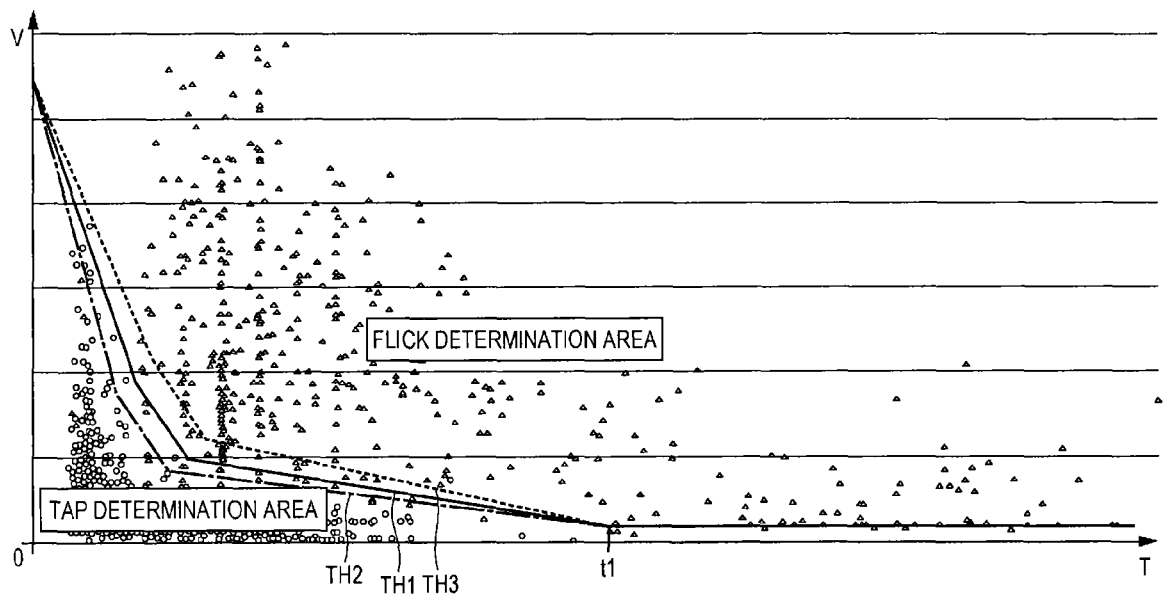
FIG. 5 is a diagram illustrating an exemplary configuration of thresholds for determining motion according to an embodiment of the present disclosure.

FIG. 5 is a diagram illustrating an exemplary configuration of thresholds for determining a flick operation from the moving velocity of a touch position.

The variation characteristic of the threshold TH1 illustrated in FIG. 5 is an exemplary characteristic set as a standard. The vertical axis in FIG. 5 is the velocity detected at each touch move point. The horizontal axis in FIG. 5 is the elapsed time since the timing of detecting the touch down point at the time of detecting that velocity. Among the times on the horizontal axis, the time t1 is a time of approximately one second, for example.

As FIG. 5 illustrates, when the elapsed time since the touch down point is an extremely short time, a comparatively fast velocity is set as the threshold TH1, but as time elapses, the threshold TH1 is gradually varied to a lower velocity. The variation characteristic of the threshold TH1 at this point is taken to be a characteristic in which the velocity drops by a large amount at first, and then the velocity drops by smaller amounts in stages until the time t1. Also, in the case of times longer than the time t1, the value of the threshold TH1 is locked to an extremely low value.

Additionally, upon detecting a velocity faster than the threshold TH1, the controller 160 determines that an event is a flick operation. Also, in the case in which the velocity is less than or equal to the threshold TH1, the controller 160 determines that an event is not a flick operation, even in the case of detecting a change in the touch position. In other words, the controller 160 determines that the event is a tap operation that only touched the touch down point.

By deciding on a threshold TH1 in this way and having the controller 160 distinguish between a flick operation and a tap operation, flick operations may be well distinguished. In other words, in the case of quickly sliding a finger a slight distance immediately after a touch down, for example, even in a situation in which a flick operation cannot be distinguished with a distance distinguishing technique of the related art, in the example of the present embodiment, the controller 160 is able to distinguish a flick operation. On the other hand, in the case of sliding a finger comparatively slowly after a touch down, by lowering the threshold for distinguishing velocity as time elapses, the controller 160 is able to distinguish a flick operation. In this way, there is an advantageous effect of being able to distinguish flick operations well in both the case of the user sliding a finger quickly and the case of moving a finger slowly.

The triangle marks and the circle marks illustrated in FIG. 5 indicate distributions of measured velocities and times for many users conducting flick operations and tap operations. The triangle marks indicate the velocities and times for the case of users conducting flick operations. The circle marks indicate the velocities and times for the case of users conducting tap operations. As FIG. 5 illustrates, most of the triangle marks exist within a flick determination area partitioned by the threshold TH1, whereas most of the circle marks exist within a tap determination area, thus demonstrating that the threshold TH1 is appropriate.

Note that since individual users have slight differences in the velocity of moving a finger during a flick operation, it is preferable to make the threshold TH1 adjustable. In other words, in the controller 160, besides the threshold TH1, there are prepared a threshold TH2 that widens the flick determination area to velocities that are slightly slower than the threshold TH1, and a threshold TH3 that narrows the flick determination area to velocities that are slightly faster than the threshold TH1, for example. Suitable adjustment is then made possible by having the user select one of the three thresholds TH1, TH2, and TH3 in an adjustment mode.

[4. Exemplary Display of Number Keys]

Next, an example of change in a display during an actual operation will be described with reference to FIG. 6 and subsequent drawings.

FIG. 6 is an example of the display 120 displaying a mail composition screen. In the upper half of the screen, a mail address field 121, a message field 122, and the like are displayed. In the lower half of the screen, a keyboard 123 is displayed.

The example in FIG. 6 illustrates an example in which a 3 horizontal by 4 vertical block of keys for the numbers 1, 2, . . . , 9, and 0 as well as the symbols * and # are arranged as the keyboard 123. To each key are assigned symbols and the like that are other than the number that each key displays.

Figure 7:
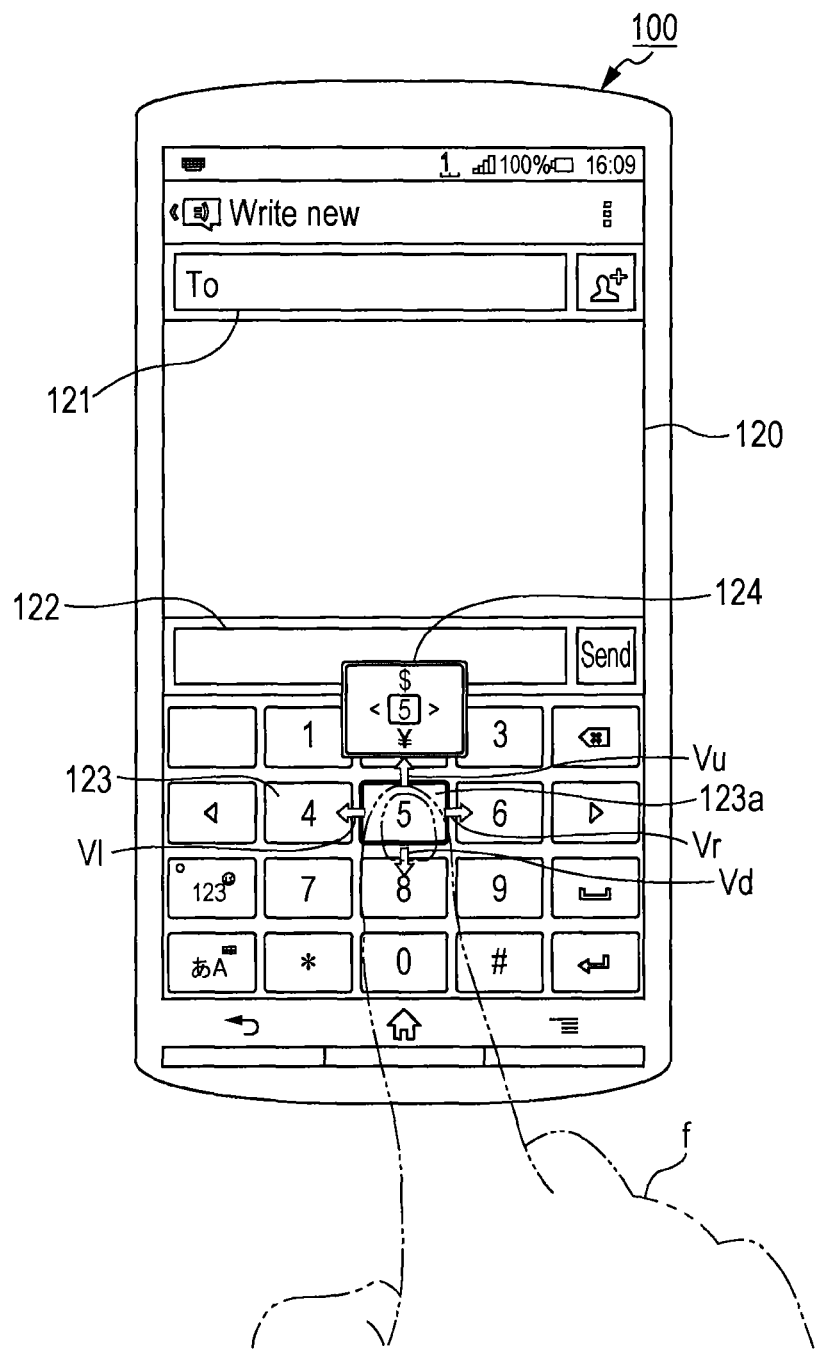
FIG. 7 is a diagram illustrating an exemplary display change from the example in FIG. 6 during a touch.

FIG. 7 illustrates a display state when a user's finger f touches the key 123a for the number "5" on the keyboard 123. While in the state of the key 123a being touched, an index pop-up 124 is displayed at a location slightly above the key 123a for the number "5". The index pop-up 124 displays "5" in the center, and displays the four symbols "<", ">", "$", and "¥" assigned to the "5" key above, below, to the left, and to the right.

Note that the state illustrated in FIG. 7 corresponds to the state in which a touch down is detected in step S12 of the flowchart in FIG. 4, and the index pop-up 124 is displayed in step S14.

At this point, when there is a flick operation in which the user's finger f slides in any direction while touching the display panel, the symbol in that sliding direction is input. For example, when the controller 160 detects a flick operation in the up direction Vu, the symbol "$" becomes the input candidate, and upon detecting a touch up, the input of the symbol "$" is confirmed. Similarly, when a flick operation in the down direction Vd, the left direction Vl, of the right direction Vr is detected, the respective symbol "¥", "<", or ">" becomes the input candidate, and upon detecting a touch up, the input of the respective symbol is confirmed. Also, when the finger if is released without sliding, "5" is input. When determining whether or not an event is such a flick operation, the controller 160 makes a determination using the threshold TH1 illustrated by the characteristic chart of FIG. 5.

The message field 122 displays a letter whose input is confirmed when in a message input mode, for example.

[5. Exemplary Display of Alphabet Keys]

FIG. 8 illustrates an example in which a 3 horizontal by 4 vertical block of keys for the alphabet and symbols are arranged as a keyboard 125. To each key are assigned multiple letters of the alphabet, a number, and symbols. The example in FIG. 8 likewise is an example of the display 120 displaying a mail composition screen, and in the upper half of the screen, a mail address field 121, a message field 122, and the like are displayed.

Figure 9:
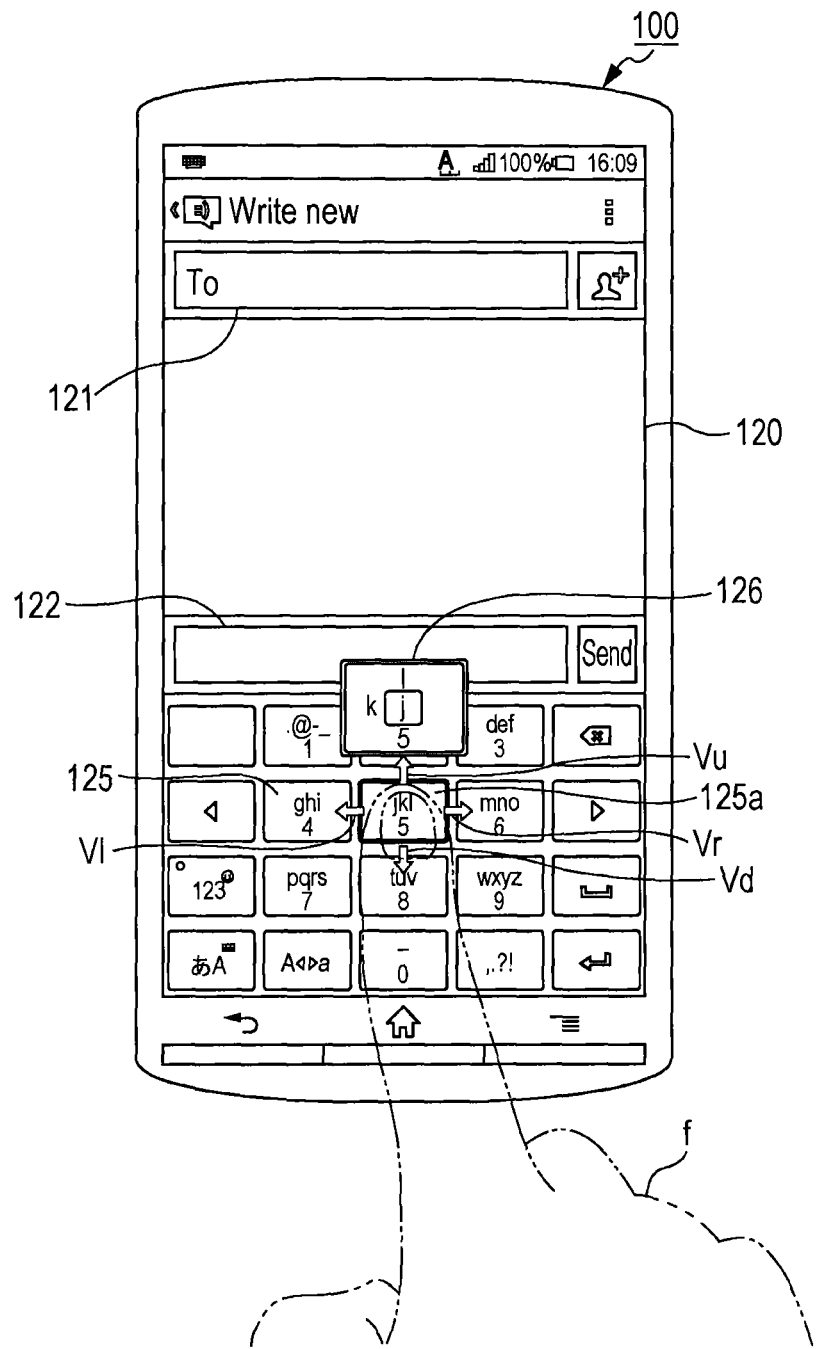
FIG. 9 is a diagram illustrating an exemplary display change from the example in FIG. 8 during a touch.

FIG. 9 illustrates a display state when a user's finger f touches the key 125a for the letter "j" on the keyboard 125.

While in the state of the key 125a being touched, an index pop-up 126 is displayed at a location slightly above the key 125a for the letter "j". The index pop-up 126 displays "j" in the center, and displays the remaining three letters and number "k", "l", and "5" assigned to the "j" key above, below, to the left, and to the right.

At this point, when there is a flick operation in which the user's finger f slides in any direction while touching the display panel, the symbol in that sliding direction is input. For example, when the controller 160 detects a flick operation in the up direction Vu, the letter "l" becomes the input candidate, and upon detecting a touch up, the input of the letter "l" is confirmed. Similarly, when a flick operation in the down direction Vd or the left direction Vl is detected, the number "5" or the letter "k" becomes the input candidate. In the example in FIG. 9, there is no assignment of a letter or the like in the right direction.

Figure 10:
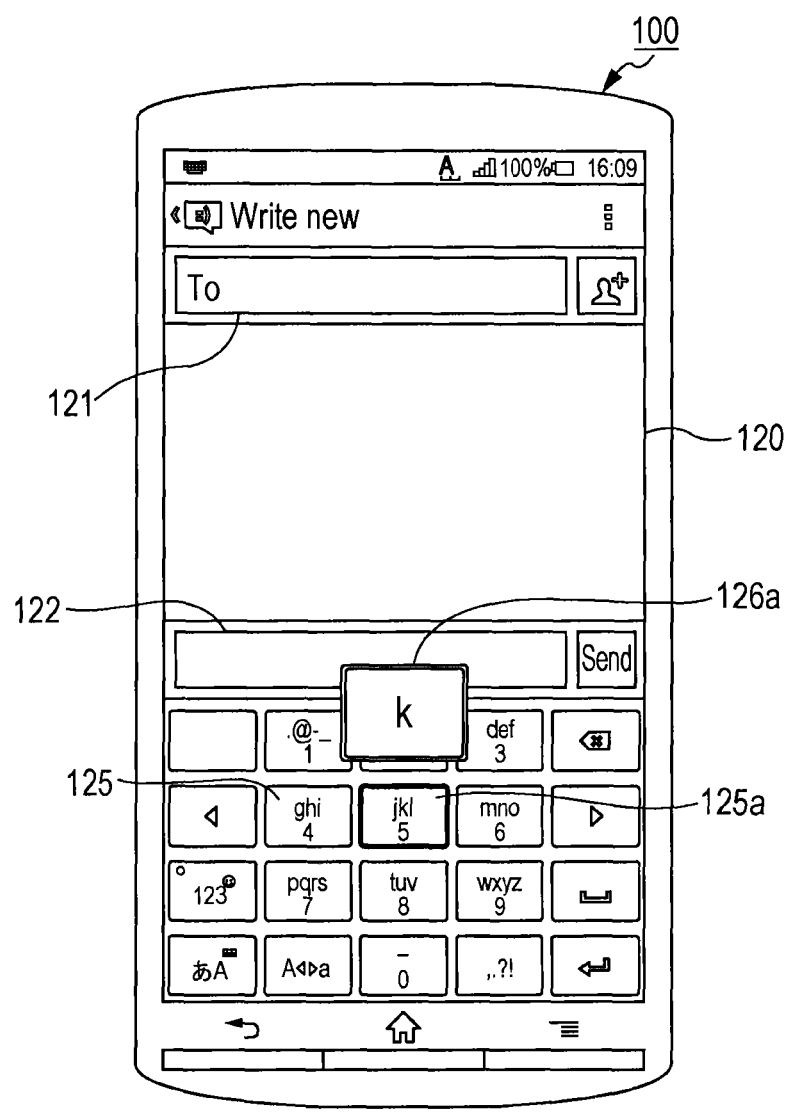
FIG. 10 is a diagram illustrating an exemplary display change from the example in FIG. 9 during a slide.

FIG. 10 is an exemplary display when the user's finger f performs a flick operation in the left direction from the state illustrated in FIG. 9.

At this point, the letter "k" assigned to the left direction of the key 125a for the letter "j" becomes the input candidate. Consequently, the index pop-up 126 changes to a letter pop-up 126a displaying the input candidate letter "k".

FIG. 10 corresponds to the state of conducting the process in step S28 of the flowchart in FIG. 4.

Figure 11:
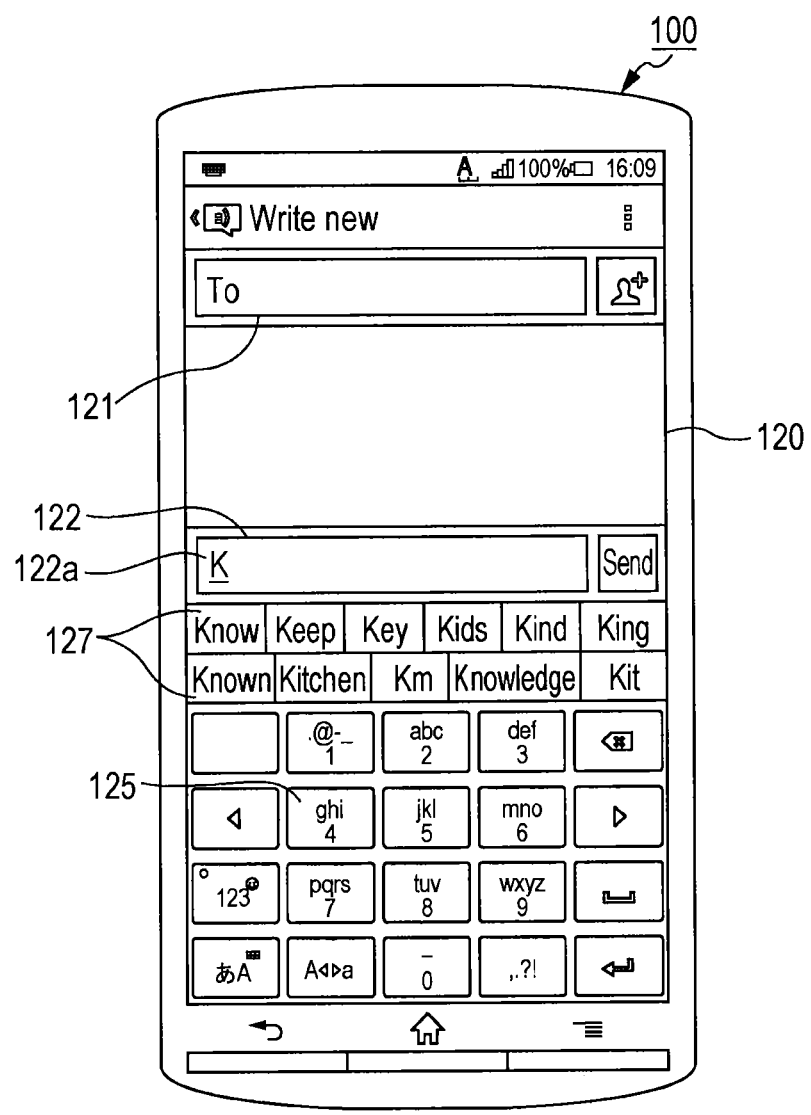
FIG. 11 is a diagram illustrating a state in which letter input has been confirmed in the example in FIG. 9.

FIG. 11 is an exemplary display when the user performs a touch up releasing the finger f from the state illustrated in FIG. 10.

At this point, the input candidate letter "k" is confirmed as the input letter, and the display 120 displays an input letter 122a in the message field 122, for example. In addition, the display 120 presents a candidate word display 127 of words starting with the letter "k". The user is able to select a desired word to input from among the candidate words with a touch operation or the like.

[6. Example of Other Display State]

Figure 12:
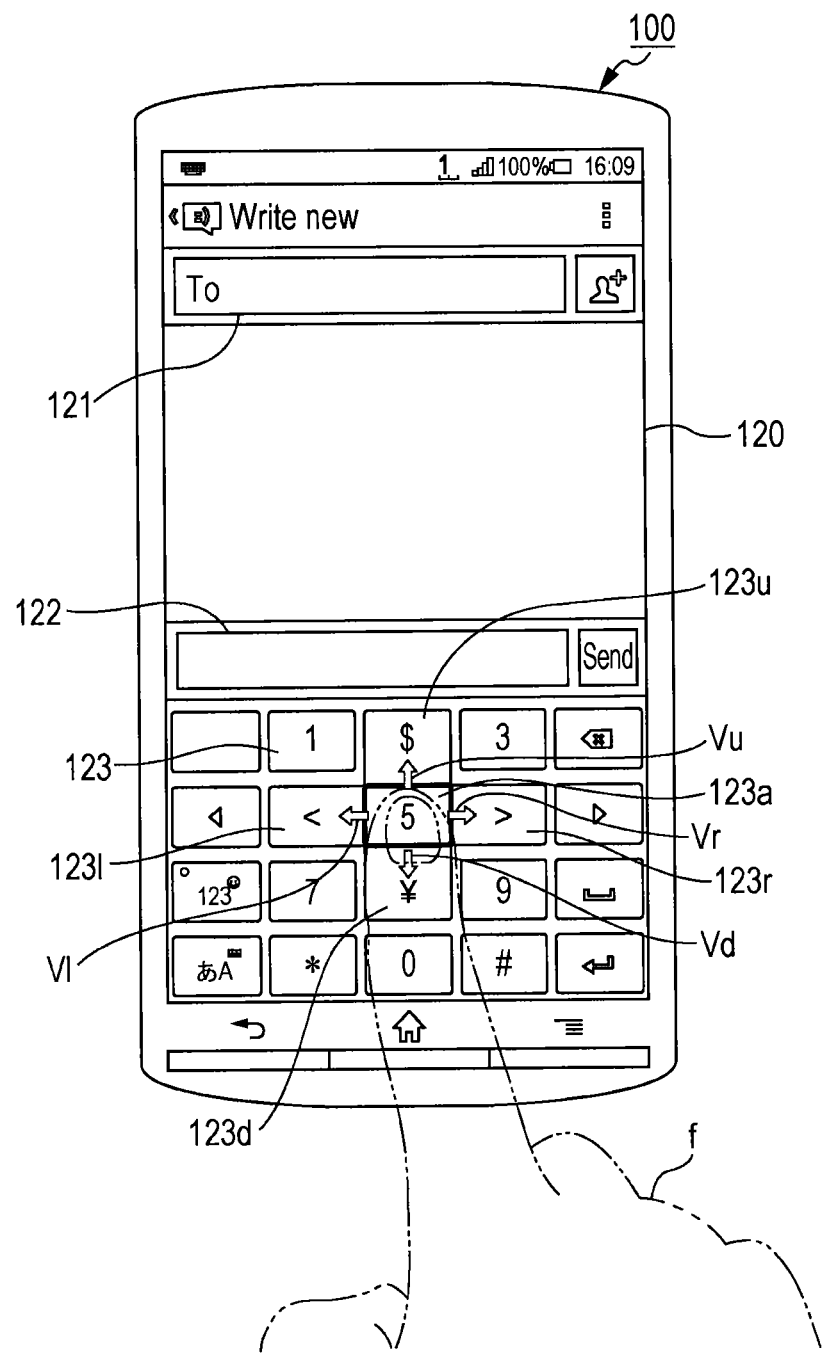
FIG. 12 is a diagram illustrating an exemplary display (example 3) according to an embodiment of the present disclosure.

FIG. 12 is a diagram illustrating another exemplary display of an index pop-up.

FIG. 12 is an exemplary display when the user's finger f touches the key 123a for the number "5" during a state of displaying the numeric keyboard 123.

In the example in FIG. 12, upon detecting a touch down on the key 123a for the number "5", the controller 160 changes the neighboring keys above, below, to the left, and to the right of the key 123a on the keyboard 123 to candidate letter (number, symbol) keys. In other words, the key 123u above the key 123a for the number "5" becomes a key for the symbol "$", the key 123d below becomes a key for "¥", the key 123l to the left becomes a key for the symbol "<", and the key 123r to the right becomes a key for the symbol ">". Note that the neighboring keys above, below, to the left, and to the right of the key 123a become keys in a contiguous state with the key 123a, and the colors of the keys are also changed from other keys.

In this way, even in the case of changing the key display state on the keyboard instead of displaying an index pop-up, the letters or symbols assigned to the respective keys may be selected on the basis of a flick operation. In the case of the example in FIG. 12, good operability is likewise obtained by conducting the process illustrated by the flowchart in FIG. 4, and setting the threshold TH1 or the like illustrated in FIG. 5.

[7. Modifications]

Note that the foregoing embodiments describe an example of selecting multiple characters assigned to a single key in the case of displaying the keyboards illustrated in FIGS. 6 to 12. In contrast, an example of the present embodiment may also be applied to another flick operation and tap operation selection process.

For example, application is also possible to a case in which, upon detecting a flick operation in a specific direction, the controller 160 executes a process that calls a function separate from the function being currently operated, and displays a menu screen or the like.

Alternatively, during a state of the display 120 displaying keyboard with a QWERTY layout, input letters are set to uppercase letters when the controller 160 detects a flick operation in the up direction (or the down direction), and input letters are set to lowercase letters during tap operations.

In addition, during a state of the display 120 displaying a keyboard with QWERTY layout, when the user performs a flick operation on the keys "q", "w", "e", "r", "t", "y", "u", "i", "o", and "p", the numbers "1", "2", ..., "9", and "0" assigned to each key may be treated as the input character.

Also, it may be configured such that when the user performs a tap operation on a space key among the keys displayed on a keyboard, a one-letter-width (half-width) space is set, whereas when an upward (or downward) flick operation is performed, a two-letter-width (full-width) space is set.

Furthermore, upon detecting a flick operation starting from a backspace key that deletes an input string one letter at a time, the controller 160 may variably set the number of letters to delete from the input letters according to the moving velocity of the touch position detected at that time.

Furthermore, upon detecting a flick operation starting from a key that gives an instruction to move the cursor position, the controller 160 may vary the magnitude of cursor movement according to the moving velocity of the touch position detected at that time.

Also, it may be configured such that the "dakuten" and "handakuten" marks added to Japanese characters may be selected with flick operations and tap operations. For example, a character with the "dakuten" mark added may be set when a tap operation is performed on a key that adds the dakuten, whereas a character with the "handakuten" mark added may be set when a flick operation is performed.

Also, during a state of the display 120 displaying a keyboard, when the controller 160 detects a flick operation at a specific location, the display 120 may display a different type of keyboard.

Alternatively, it may be configured such that when the controller 160 detects a flick operation at a specific location, the character input type by the keyboard is switched, such as switching between uppercase and lowercase, for example.

In addition, a program (software) that conducts the determination process described with the flowchart in FIG. 4 may be created, and the program may be stored on a recording medium. By preparing this program stored on a recording medium, a client device with the program installed thereon becomes a client device that conducts a process of the present disclosure.

Also, the configurations and operations described in the claims of the present disclosure are not limited to the example of the foregoing embodiment. It is to be understood as obvious by persons skilled in the art that various modifications, combinations, and other exemplary embodiments may occur depending on design or other factors insofar as they are within the scope of the claims or their equivalents.

Additionally, the present disclosure may also take configurations like the following.

(1) A client device comprising:
a touch panel stacked with a display or integrally disposed with a display; and
a controller that, during a state of the display displaying a designated image, upon detecting that a specific location in the image has been touched with the touch panel, detects a velocity by which a touch position changes and a direction in which the touch position changes while the touch continues, and determines an input instruction.

(2) The client device according to (1), wherein
when the velocity detected while the touch continues exceeds a predetermined threshold, the controller determines that movement in a slide direction detected at that time has been instructed.

(3) The client device according to (2), wherein
a threshold of the velocity is raised when the time that the touch continues is short, and a threshold of the velocity is lowered when the time that the touch continues is long.

(4) The client device according to (2) or (3), wherein
a variation characteristic that varies the threshold enables variation in plural stages.

(5) The client device according to any one of (1) to (4), wherein
while the touch continues, the controller detects coordinates of a touch position at a fixed time interval, and detects velocity from a difference between the detected coordinates and last detected coordinates, and the fixed time.

(6) The client device according to any one of (1) to (5), wherein
the designated image is an image of a keyboard, and the controller, upon detecting that a specific key in the image of a keyboard has been touched with the touch panel, detects a velocity by which a touch position changes and a direction in which the touch position changes while the touch continues, and determines an input letter, number, or symbol.

(7) An operating method applied to a client device equipped with a touch panel stacked with a display or integrally configured with a display, comprising:
a detecting step that, during a state of the display displaying a designated image, upon detecting that a specific location in the image has been touched with the touch panel, detects a velocity by which a touch position changes and a direction in which the touch position changes while the touch continues; and
a determining step that determines an input instruction on the basis of the velocity and direction detected in the detecting step.

(8) A recording medium storing a program to be installed on a client device equipped with a touch panel stacked with a display or integrally configured with a display, the program causing the client device to execute:
a detecting step that, during a state of the display displaying a designated image, upon detecting that a specific location in the image has been touched with the touch panel, detects a velocity by which a touch position changes and a direction in which the touch position changes while the touch continues; and
a determining step that determines an input instruction on the basis of the velocity and direction detected in the detecting step.

REFERENCE SIGNS LIST

100: mobile phone client device
101: antenna
103: audio processor
104: speaker
105: microphone
106: antenna
107: short-range wireless communication processor
108: sensor unit
110: wireless communication processor
120: display
123, 125: keyboard 124, 126, 126a: index pop-up
130: touch panel
140: operating keys
150: memory
160: controller

What is claimed is:

1. A touch input device comprising:
a touch panel stacked with a display or integrally disposed with a display; and
circuitry that, during a state of the display displaying a designated image, upon detecting that a specific location in the image has been touched with the touch panel, detects a velocity by which a touch position changes and a direction in which the touch position changes while the touch continues, when the velocity detected while the touch continues exceeds a predetermined threshold, the circuitry determines that a specified movement in a slide direction detected at that time has been instructed and determines an input instruction, from a plurality of input instructions associated with the specific location, based on the slide direction of the specified movement,
wherein each of the plurality of input instructions corresponds to one of a plurality of slide directions each originating from the specific location in the image as an initial touch down point on the touch panel,
wherein the designated image is an image of a keyboard, a specific key in the image of a keyboard is configured to be the initial touch down point, and the plurality of input instructions corresponding to the respective plurality of slide directions each originating from the specific key include at least an input of respective different text characters from at least one of a letter, number, and symbol.

2. The client device according to claim 1, wherein the predetermined threshold of the velocity is adjusted based on the time that the touch continues.

3. The client device according to claim 2, wherein a variation characteristic that varies the predetermined threshold enables variation in plural stages.

4. The client device according to claim 1, wherein while the touch continues, the circuitry detects coordinates of a touch position at a fixed time interval, and detects velocity from a difference between the detected coordinates and last detected coordinates, and the fixed time.

5. A touch input method implemented by a touch input device equipped with a touch panel stacked with a display or integrally configured with a display, comprising:
during a state of the display displaying a designated image, upon detecting that a specific location in the image has been touched with the touch panel, detecting a velocity by which a touch position changes and a direction in which the touch position changes while the touch continues; and
when the velocity detected while the touch continues exceeds a predetermined threshold, determining that a specified movement in a slide direction detected at that time has been instructed, and determining an input instruction from a plurality of input instructions associated with the specific location, based on the slide direction of the specified movement,
wherein each of the plurality of input instructions corresponds to one of a plurality of slide directions each originating from the specific location in the image as an initial touch down point on the touch panel,
wherein the designated image is an image of a keyboard, a specific key in the image of a keyboard is configured to be the initial touch down point, and the plurality of input instructions corresponding to the respective plurality of slide directions each originating from the specific key include at least an input of respective different text characters from at least one of a letter, number, and symbol.

6. A non-transitory computer readable recording medium storing a program to be installed on a touch input device equipped with a touch panel stacked with a display or integrally configured with a display, the program causing the touch input device to execute a method comprising:
during a state of the display displaying a designated image, upon detecting that a specific location in the image has been touched with the touch panel, detecting a velocity by which a touch position changes and a direction in which the touch position changes while the touch continues; and
when the velocity detected while the touch continues exceeds a predetermined threshold, determining that a specified movement in a slide direction detected at that time has been instructed, and determining an input instruction from a plurality of input instructions associated with the specific location, based on the slide direction of the specified movement,
wherein each of the plurality of input instructions corresponds to one of a plurality of slide directions each originating from the specific location in the image as an initial touch down point on the touch panel,
wherein the designated image is an image of a keyboard, a specific key in the image of a keyboard is configured to be the initial touch down point, and the plurality of input instructions corresponding to the respective plurality of slide directions each originating from the specific key include at least an input of respective different text characters from at least one of a letter, number, and symbol.

* * * * *